United States Patent [19]
Susuki et al.

[11] 3,775,062
[45] Nov. 27, 1973

[54] CURRENT FLOW, ANNULAR THIN FILM, GAS-LIQUID REACTOR

[75] Inventors: Rinnosuke Susuki; Shinzaburo Kushibiki; Shigeru Mitsuoka; Kaname Abe, all of Tokyo, Japan

[73] Assignee: Lion Fat & Oil Co., Ltd., Tokyo, Japan

[22] Filed: Sept. 24, 1969

[21] Appl. No.: 860,729

[30] Foreign Application Priority Data
Sept. 30, 1968 Japan.............................. 43/70114

[52] U.S. Cl............... 23/285, 260/686 J, 165/154, 165/155, 165/159, 165/161
[51] Int. Cl......................... C07b 13/02, B01j 1/00
[58] Field of Search..................... 23/285, 284, 1; 165/154, 155, 159, 161

[56] References Cited
UNITED STATES PATENTS
| | | | |
|---|---|---|---|
| 2,910,276 | 10/1959 | Escher | 165/154 X |
| 3,238,902 | 3/1966 | Escher | 165/159 X |
| 3,346,042 | 10/1967 | Seehausen | 165/154 |
| 3,407,870 | 10/1968 | Braune et al. | 165/155 X |
| 3,427,342 | 2/1969 | Brooks et al. | 23/284 X |

*Primary Examiner*—James H. Tayman, Jr.
*Attorney*—Woodhams, Blanchard and Flynn

[57] ABSTRACT

An apparatus for the continuous reaction of a liquid with a gas which comprises: two externally cooled, substantially concentric, stationary circular reaction surfaces, a rotatable circular rotor having a lid as well as a skirt extending from the upper end of the space between said reaction surfaces partway to the bottom of said space, a distribution ring for supplying recycled reaction product for quenching the reaction mixture which ring is equipped with a bedplate devised to form in combination with the lower end of a cooling jacket provided on the outer reaction surface a downwardly opening inlet for the recycled reaction mixture; means for turning the rotor and means for passing the reactant liquid and the reactant gas in parallel streams from the upper part to the space between said reaction surfaces and said rotor; and a circular wall beneath the outer reaction surface which is located concentrically with said reaction surface.

2 Claims, 1 Drawing Figure

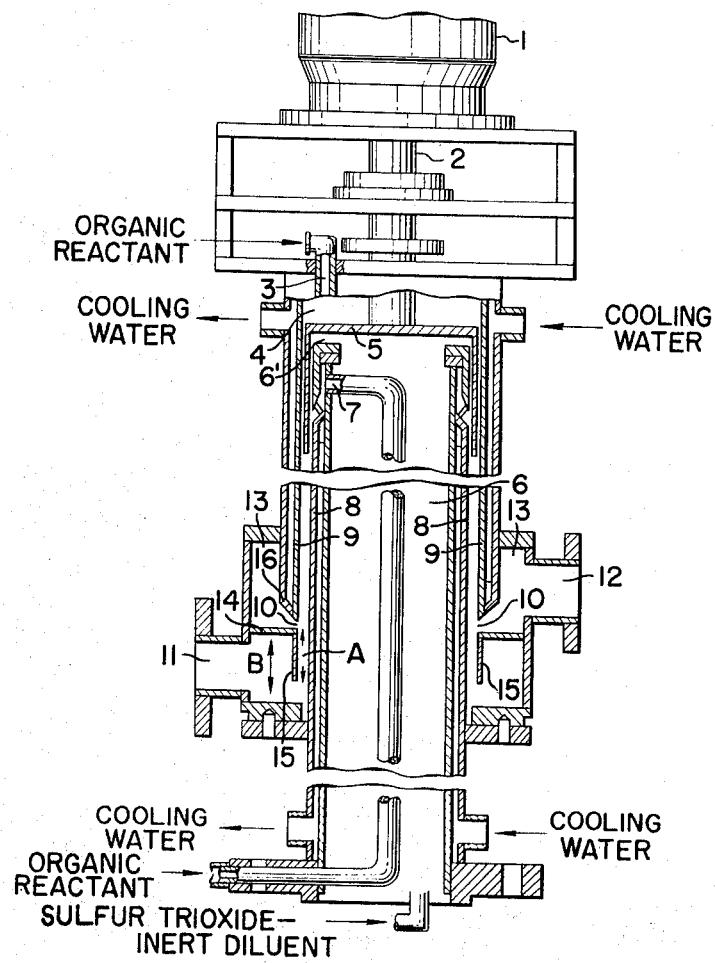

CURRENT FLOW, ANNULAR THIN FILM, GAS-LIQUID REACTOR

BACKGROUND OF THE INVENTION

1. Field of the invention

The present invention relates to an apparatus for the continuous reaction of a liquid with a gas, particularly to be employed for the sulfonation or sulfation of organic reactants.

2. Description of the prior art

The effectuation of gas-liquid reaction, such as the reaction for sulfonation (hereinafter inclusive of sulfation) of alkyl aryl hydrocarbons, fatty alcohols and other sulfonatable or sulfatable organic materials through a rapid and continuous process thereby obtaining a high-purity product in a satisfactory yield, has long been considered difficult. Meanwhile, a new process and relevant apparatus has of late been proposed as a means for overcoming said difficulty. Said apparatus comprises: two reaction surfaces which are stationary, substantially concentric, circular and respectively cooled externally; a lidded, circular, rotatable rotor which is located in the space between said reaction surfaces and extends from the upper end of said space partway to the lower end thereof; a circular distribution ring for the recycled reaction product for quenching the reaction mixture which ring is provided in the lower part of the reaction zone and encircles the reactor; a bedplate which is devised to form an inlet for the reaction product opening downwardly in combination with the lower end of the cooling jacket equipped on the outer reaction surface; and means for turning said rotor and means for passing the reactant liquid and the reactant gas in parallel streams from the upper part of the space between said reaction surfaces and said rotor. The mechanism of said apparatus is as explained in the following on the basis of the accompanying drawing.

The numeral references 8 and 9 in the drawing show respectively the inner reaction surface and the outer reaction surface which are stationary, substantially concentric and circular. The numeral reference 5 denotes a rotor, which has a lid and a skirt forming the side thereof and extending from the upper end of the space between the reaction surfaces 8 and 9 downwardly partway to the lower end of said space, and is capable of turning within said space. Power to rotate the rotor 5 is supplied through the shaft 2 which is connected with motor 1. It is preferable that the rotor has a short solid skirt and open veins positioned below said skirt and inclined at a certain angle to the vertical axis. And, it is desirable that said angle be an acute angle, such as 45°, to the vertical axis.

The reaction surfaces 8 and 9 extend downwardly below the rotor 5, and are externally cooled with water by means of jackets along their respective lengths. The jackets can be so devised as to expedite the circulation of the cooling water through appropriate provision of intercepting plates or baffles. The space between the reaction surfaces 8 and 9 is designed to extend to the collection chamber and the product removal outlet 11. A portion of the reacting liquid, viz., the liquid reactant enters the reactor through an inlet 3 while the other portion thereof enters said reactor through an inlet 7, and subsequently these portions of the liquid reactant enter the space between the rotor 5 and the outer reaction surface 9 and the space between the rotor 5 and the inner reaction surface 8, respectively, to be fed to each reaction surface and then flow downwardly. The reacting gas, viz., the gaseous reactant enters the space between the rotor 5 and the reaction surface 8 from the chamber 6 by the inlet 6'. The numeral reference 12 denotes the entrance to the distribution tube for the cooled recycled product of the reaction, and 13 denotes a circular distribution ring encircling the reactor at the lower part of the reaction zone and serving to distribute the cooled recycled reaction product for use in cooling the freshly formed reaction product. The bedplate 14 of the distribution ring 13 in combination with the lower end 16 of the cooling jacket for the outer reaction surface 9 forms the inlet 10 for the cooled recycled reaction product which inlet opens downwardly. To cope with the considerably high temperature which occurs in a very short time due to the reaction being effected at a great velocity, the freshley formed reaction product is quickly cooled by means of the cooling jacket and within the quenching zone as it descends inside the reactor.

Such factors as dilution, pressure, velocity of feeding, etc. of a gaseous reactant (sulfur trioxide) are decided according to the sort of reaction intended. For instance, in case of the sulfonation of alkyl aryl hydrocarbons, fatty alcohols, etc., they are decided as follows. That is, such material is used after being diluted with an inert diluent to bring about the concentration of sulfur trioxide in the range of about 2–8 percent in terms of the content. As to the diluent, air, nitrogen and sulfur dioxide are applicable. As to the pressure, it is required to apply a relatively low pressure, which is generally limited to about 5 atm (gauge). The velocity required is at least about 20–90 m/sec. Inasmuch as the liquid reactant enters the reactor by small holes or fine slits positioned concentrically to the reaction surface, the liquid reactant never comes in contact with the gaseous reactant to cause reactions prior to entering the reaction zone proper. By the rotation of the rotor and the action of the entering gaseous reactant, mixing of the liquid and gaseous reactants and distribution of the liquid reactant to the reaction surfaces are effected and the reaction progresses thereby. The reaction is effected at a great velocity in a very short time and, therefore, the residence time of each reaction product in the reaction zone is extremely short. For instance, in case of the sulfonation of alkyl aryl hydrocarbons, fatty alcohols, etc. with sulfur trioxide, said residence time of the liquid reaction mixture is in the range of about 0.03–10 seconds, and preferably about 0.1–1 second. In case of very fluid reactants, the residence time thereof approaches that of the gas stream. The residence time of the main gas stream in the gaseous reactants is by far shorter than that of the liquid reaction mixture. The actual superficial gas velocity of the sulfur trioxide/inert diluent mixture employed is in the range of about 20–60 m/sec, but the residence time in the reactor in this case is in the range of about 0.01–0.05 seconds. Further, the reaction mixture thus produced is required to be removed from the reaction zone for the sake of rapid cooling and, therefore, it is usually cooled in a few seconds at the quenching zone. If the residence time of the reaction product at the reaction zone should be longer than indicated or the cooling should fail to be effected immediately after its coming out from the reaction zone, degradation of the product will take place. On the occasion of the cooling, the cooled recycled reaction product within the distribution ring 13 flows in and is mixed with the hot reaction product which is not fully cooled yet, whereby there is effected a rapid cooling. The temperature of the quenching zone is adequately determined in due consideration of the viscosity and the solidifying point of the intended reaction product. And, the amount of the cooled recycled reaction product to be employed is such an amount as is capable of effecting the required cooling substantially at once, to wit, in a few seconds. In case of the sulfonation of, for instance, alkyl aryl hydrocarbons, fatty alcohols, etc. with sulfur trioxide, the foregoing amount of the cooled recycled reaction product fed in to cool the freshly formed product is in the range of about 4:1 – 50:1 in terms of the weight ratio. The greater part of the reaction is usually effected in the area of the rotor of the reactor and the area adjacent to the lower part thereof. In case of the sulfonation of, for instance, alkyl aryl hydrocarbons, fatty alcohols, etc., with sulfur trioxide, about 90 percent of the reaction is usually effected in the area of the rotor of the reactor, but it is preferable that about 80–95 percent of the reaction be effected in the area adjacent to the lower part of said rotor. The reaction is usually not fully completed in the foregoing area and is further carried out in the quenching zone following the reaction zone and, in some cases, even in the digestion zone succeeding thereto, but it goes without saying that it is preferable to make the reaction progress as far as possible within the aforesaid area. There is a close inter-relation among the distance of the two concentric reaction surfaces of the present apparatus, the velocity of the gaseous reactant and the length of the reaction tube. To elucidate said inter-relation with reference to the foregoing case, in order to effect about 80–95 percent of the desired reaction within the area ranging from 15 cm to 20 cm immediately beneath the rotor in case where the spacing between the two reaction surfaces is about 0.6 cm and the velocity of the sulfur trioxide-inert gas mixture is 60–90 m/sec, the optimum length of the reaction tube is about 90 cm. As the spacing of said reaction surfaces increases resulting in the high velocity of the gaseous reactant, a longer reaction tube becomes necessary. For instance, if the spacing of the two reaction surfaces varies within the range of 0.95–1.27 cm, the length of the reaction tube is required to be about 3 m. On the other hand, if the distance of said reaction surfaces is short, a shorter reaction tube and a lower velocity of the gas are applicable. The quenched reaction product is caused to separate therefrom the inert diluent and the remaining unreacted gas at the separation zone. In the light of the foregoing, this apparatus has admittedly been successful in that it has made it possible not only to carry out the continuous reaction, which is difficult and apt to form by-products, such as the sulfonation of, for instance, alkyl aryl hydrocarbons, fatty alcohols, etc., but also to decrease the formation of said by-product and obtain a high-purity product at a good rate of yield.

However, even this apparatus, when examined minutely, can hardly be said to be fully satisfactory from the viewpoint of the reaction rate. To be more precise, according to this apparatus, the greater part of the reaction is effected in the area of the rotor of the reactor and the area adjacent to the lower part thereof, while the remaining portion of the reaction is carried out in the quenching zone following the foregoing zone or, in some cases, even in the digestion zone succeeding thereto as set forth above. The portion of the reaction to be carried out in the area of the rotor of the reactor and the area adjacent to the lower part thereof is usually about 80 percent or more and at best about 95 percent, while the rest is carried out in the later process. Accordingly, in the light of the decrease in the amount of by-product and the simplicity of subsequent processes as well as the rate of yield, to augment the reaction rate in this process to some extent proves particularly fruitful in case of such a reaction as above, and it has quite a great significance from the industrial point of view. The inventors of the present invention have devoted themselves to probing this matter and, as a result, arrived at said invention.

SUMMARY OF THE INVENTION

The present invention relates to an apparatus for the continuous reaction of a liquid with a gas which comprises: two externally cooled, substantially concentric, stationary circular reaction surfaces, a rotatable circular rotor having a lid as well as a skirt extending from the upper end of the space between said reaction surfaces to only a portion of said space, a distribution ring for the cooled recycled reaction product for quenching the freshly formed reaction mixture which is equipped with a bedplate devised to form an inlet opening downwards in combination with the lower end of a cooling jacket equipped on the outer reaction surface; means for turning the rotor and means for passing the reactant liquid and the reactant gas in parallel streams from the upper part to the space between said reaction surfaces and said rotor; and a circular wall beneath the outer reaction surface which is located concentrically with said reaction surface and devised to substantially extend the reaction zone to see that the reaction be carried out more sufficiently.

BRIEF DESCRIPTION OF THE DRAWING

The accompanying drawing shows a vertical section of a typical apparatus embodying the present invention.

DESCRIPTION OF THE PREFERRED EMBODIMENTS

The apparatus according to the present invention as shown in the accompanying drawing is so devised as to make the circular wall 15, which is concentric with the inner reaction surface 8 and mounted on the bedplate 14 of the distribution ring 13, form a downwardly extending skirt within the quenching zone in the lower part of the reactor. In order to mount the circular wall 15 on the bedplate 14, it is preferable to locate said circular wall 15 so that it forms a downward extension of the outer reaction surface 9. However, the location of said circular wall 15 is not restricted to this particular arrangement.

Even when the disposition of said circular wall 15 differs from the abovementioned one, the reaction can be conducted more effectively that when no circular wall 15 is provided, and, further, it should be noted that, the farther it is located from the above-described desired position, the lower will be its effectiveness. In the apparatus according to the prior art, the reaction mixture descends along the space between the inner and outer reaction surfaces while being cooled and arrives at the lower part of the apparatus, where it is mixed with and quenched by the cooled reaction product and immediately progresses to a spacious collection chamber while thus being quenched. And, during such processes, the reaction is being effected gradually. According to the present invention, however, because the circular wall 15 is mounted on the bedplate 14 concentrically with the inner reaction surface 8 within the quenching zone, the descending reaction mixture cannot travel directly to the spacious collection chamber and it has to pass beneath the circular ring 15. Therefore, the zone wherein the reaction mixture comes in contact with the inner reaction surface is increased to that extent. In other words, the effective length of the reaction zone is extended. This device serves to improve the reaction rate, resulting in the simplification of subsequent processes, not to speak of an increase in the recovery of product.

The effect of the present invention is further elucidated by the following example.

Example

The reaction was effected by employing an apparatus as shown in the accompanying drawing. In said drawing:

A = 20 cm
B = 30 cm

In case of this example, straight-chain type dodecyl benzene at 25°C was sulfonated under the following condition:

amount of material feed — 900 kg/hr
rate of material feed (inner cylinder/outer cylinder) — 5/5
temperature of reactor cooling water at the inlet — 25°C
temperature of heat-exchanger cooling water at the inlet — 29°C
mol ratio of $SO_3$ (to material) — 1.08 mol
temperature of $SO_3$-air mixed gas — 40°C
concentration of $SO_3$ within $SO_3$-air mixed gas — 4 vol percent
temperature at the outlet of quenching tank — 50°C The resultant sulfonic acid was analyzed as follows:

|  | in case of apparatus of prior art | in case of apparatus of the present invention |
|---|---|---|
| petroleum ether extract (%) | 1.87 | 1.04 |
| reaction rate (%) | 97.5 | 98.7 |
| degree of coloring by Klett-Samerson Colorimeter (employing 10% solution) | 53 | 50 |

The total amount of sulfur contained in the exhaust gas decreased from 700 ppm to 300 ppm.

The reaction rate increased from 97.5 percent to 98.7 percent, but it is indisputable that, in case of a reaction of such character, this increase has particularly a great significance from the industrial point of view. The degrees of coloring of the products from the apparatus of the prior art and that of the present invention seem to be almost equal, but the fact that the total sulfur content of the exhaust gas decreases sharply from 700 ppm down to 300 ppm according to the present invention is quite a welcome matter from the viewpoint of economy and its contribution as a countermeasure for pollution as well. Besides, the simplification of the after-processes brought about by the present invention is also invaluable from the industrial point of view.

The foregoing elucidation of the apparatus of the present invention has been made with reference to the reaction for continuous sulfonation of alkyl aryl hydrocarbons, fatty alcohols and other sulfonatable organic materials, but it is indisputable that the present apparatus is also applicable in effecting other continuous gas-liquid reactions of the same character as above.

What is claimed is:

1. In a thin film, concurrent flow, gas-liquid reactor, comprising two externally cooled, substantially concentric, radially spaced, cylindrical reaction surfaces defining an annular reaction zone, a rotatable rotor having a cylindrical skirt extending from the upper end of the annular reaction zone partway to the lower end thereof, means for supplying reaction liquid and reaction gas to the upper end of the annular reaction zone for concurrent downward flow through said reaction zone, an annular distribution manifold for receiving cooled recycled reaction product, said manifold encircling the lower end of the outer reaction surface and defining therewith an annular inwardly opening inlet communicating with the lower end of said reaction zone for feeding said cooled recycled reaction product into the fresh reaction mixture flowing downwardly out of said reaction zone in order to quench said reaction mixture, and an annular outlet for the reaction mixture located directly below said inlet and isolated therefrom by an imperforate bed plate, the improvement wherein a cylindrical wall extends downwardly from the radially inner edge of said bed plate partway across said outlet, said wall having a cylindrical imperforate inner surface surrounding and spaced radially outwardly from the inner reaction surface and defining therewith an elongated annular quenching zone coaxial with said annular reaction zone and which communicates with said reaction zone and said inlet for cooled recycled reaction product.

2. A reactor according to claim 1, wherein said inner surface of said wall is of substantially the same diameter as the outer reaction surface and constitutes an extension thereof.

* * * * *